United States Patent [19]

Marc

[11] Patent Number: 4,524,037
[45] Date of Patent: Jun. 18, 1985

[54] METHOD AND APPARATUS FOR FORMING A FLEXIBLE THERMOPLASTIC RESIN FOAM ARTICLE USING AN RF FIELD

[76] Inventor: Michel Marc, 48 Ridge Hill Farm Rd., Wellesley, Mass. 02181

[21] Appl. No.: 408,159

[22] Filed: Aug. 16, 1982

[51] Int. Cl.³ .............................................. B29D 27/00
[52] U.S. Cl. ...................... 264/26; 264/321; 425/174.8 E; 425/398; 425/817 R
[58] Field of Search ............ 264/26, 321; 425/817 R, 425/174.8 E, 398

[56] References Cited

U.S. PATENT DOCUMENTS

| | | | |
|---|---|---|---|
| 2,946,713 | 7/1960 | Dusina, Jr. et al. | 264/321 X |
| 2,966,469 | 12/1960 | Smythe et al. | 264/26 |
| 3,010,157 | 11/1961 | Cizek | 264/26 |
| 3,082,483 | 3/1963 | Bickford | 264/321 |
| 3,170,974 | 2/1965 | Jacobs | 264/321 X |
| 3,242,238 | 3/1966 | Edberg et al. | 264/26 |
| 3,243,485 | 3/1966 | Griffin | 264/26 X |
| 3,244,571 | 4/1966 | Weisman | 264/321 X |
| 3,331,899 | 7/1967 | Immel | 264/26 |
| 3,345,439 | 10/1967 | Everard et al. | 264/26 |
| 3,400,040 | 9/1968 | Osgood | 264/321 X |
| 3,444,275 | 5/1969 | Willett | 264/26 |
| 3,475,522 | 10/1969 | Garibian et al. | 264/26 |
| 3,640,913 | 2/1972 | Cerra | 264/26 X |

Primary Examiner—Philip Anderson
Attorney, Agent, or Firm—Wolf, Greenfield & Sacks

[57] ABSTRACT

A process and associated apparatus for forming a foam plastic article using a mold with a mold cavity and a pair of electrodes across which an RF field may be impressed. The foam material that is to be processed is inserted into the mold and is then compressed. The compression may be at least on the ratio of 2 to 1 and perhaps as high or higher than 8:1. An RF heating field is applied while maintaining the foam material compressed and after the heat is terminated, the foam material is permitted to expand to conform to a mold shape as the material cools. This pre-compression step enables substantial reduction in processing time.

15 Claims, 4 Drawing Figures

METHOD AND APPARATUS FOR FORMING A FLEXIBLE THERMOPLASTIC RESIN FOAM ARTICLE USING AN RF FIELD

BACKGROUND AND SUMMARY OF THE INVENTION

The present invention relates in general to an RF heating process and associated apparatus. More particularly, the present invention relates to an RF heating process employed in the making or forming of molded plastic parts or pieces, particularly items made of plastic foams such as polyethelene or polyproplene foam.

The present technique for forming foam articles is illustrated in FIG. 1 herein in which there is schematically illustrated a mold 10 having a cavity for receiving the unprocessed foam block 12. Herein, for the sake of simplicity, the article being manufactured is simply of cubic form. However, it is understood that both the prior art technique and the technique of the present invention may be used in forming varied size and shape articles.

Associated with the mold 10 which may be of silicone rubber, are a pair of electrodes 14 and 16. The electrode 14 may be a movable electrode while the electrode 16 may be fixed. FIG. 1 schematically illustrates an RF source 18 coupling across the electrodes 12 and 14. FIG. 1 illustrates the foam block 12 having been inserted into the mold with the electrodes then moved to the position shown in FIG. 1. The RF field is then applied by source 18 to cause heating of the foam for the purpose of curing it and forming it into the desired shape. The foam is preferrably free-formed prior to insertion into the mold and has a shape that already substantially conforms to the shape of the mold. When the electrodes 14 and 16 are closed so as to ready the apparatus for heating, there may be a slight compression of the foam block 12. However, the prior art technique has never taught any substantial compression of the foam, particularly the art has not shown compression of the foam for the purpose of substantially reducing the heating and curing time thereof.

In the arrangement illustrated in FIG. 1 the typical heating time which represents some portion of the overall manufacturing cycle time, is typically in the order of about five minutes. It is over this five minute interval that RF energy is applied for heating. The mold is preferably constructed so as to have a high dielectric constant so that as much heat as possible is dissipated in the material that is being formed with less material being dissipated in the mold itself.

It is an object of the present invention to provide an improved RF heating process and associated apparatus in which the article can be formed over a heating period that is of substantially reduced duration. In accordance with the present invention it has been found that the heating period can be reduced from the afore mentioned typical five minute interval to on the order of 1½ minutes. This is accomplished in accordance with the present invention by an RF heating process which combines RF heating with the use of a pair of electrodes, in combination with, substantial compression of the foam material with the foam material being maintained compressed during the heating cycle when the RF energy is applied. It has been found that by carrying out this compression while applying RF energy, that the heating time can be substantially reduced. After the heating cycle is over the previously compressed foam is permitted to expand as it cools and it then conforms to the desired over all mold shape.

In accordance with the apparatus of the present invention, in order to provide the aforementioned compression of the foam material, there may be provided a plug or the like. This plug can also be constructed of silicone rubber preferably loaded to have a high dielectric constant. This plug is temporarily used for compression of foam and is maintained in use during the heating cycle. The plug is then removed to enable expansion of the foam into its desired final shape.

BRIEF DESCRIPTION OF THE DRAWING

Numerous other objects, features and advantages of the invention should now become apparent upon the reading of the following detailed description taken in conjunction with the accompanying drawing, in which.

DETAILED DESCRIPTION

Figure 1:
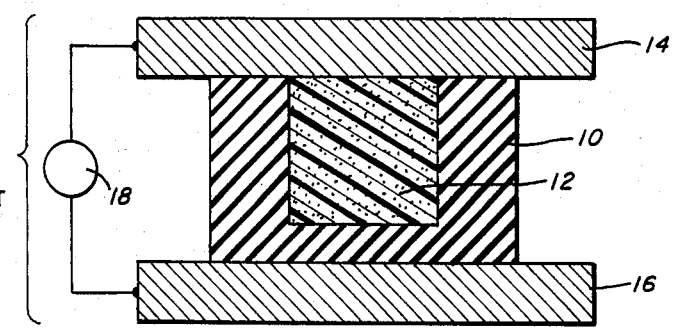
FIG. 1 is a prior art diagram showing the technique for forming foam articles with RF energy.
Figure 2:
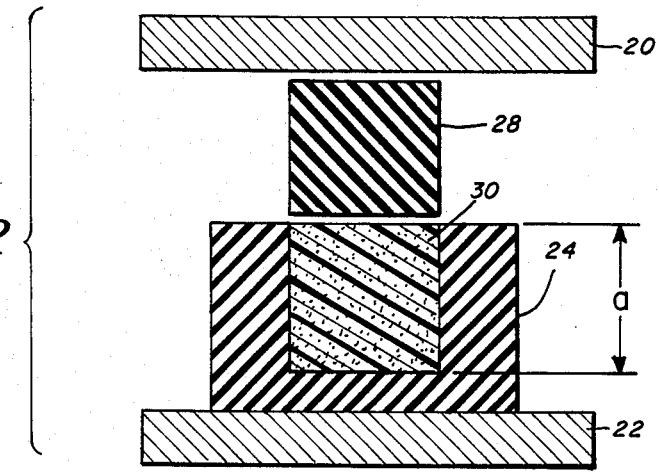
FIG. 2 is an exploded view of the RF heating process of the present invention showing an initial step of the process wherein the foam is in the cavity and the plug is about to be inserted.
Figure 3:
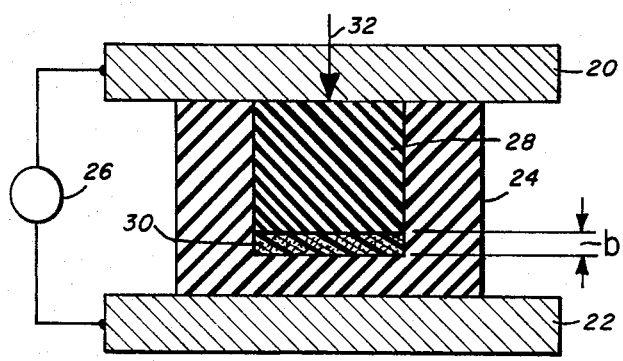
FIG. 3 is a further schematic cross sectional view showing the compresssing phase of the invention with the plug being used in combination with the upper electrode for compressing the foam material during the heating phase.
Figure 4:
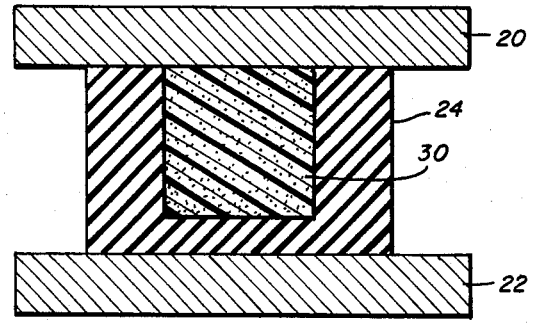
FIG. 4 shows a cross sectional view of the same mold after the steps of FIGS. 2 and 3 with the foam material simply being permitted to expand to the proper mold shape with the plug having been removed.

FIG. 1 has been described previously in connection with the discussion of the prior art arrangement of employing RF heating in the construction of foam articles or items. FIGS. 2-4 are sequential schematic cross sectional views showing the steps in carrying out the process of the present invention. In the prior art arrangement the heating period that is necessary in order to properly form the part is on the order of about five minutes. With the technique of the present invention exemplified in FIGS. 2-4 this heating period is then reduced substantially to on the order of 1-1.5 minutes. It is understood that the heating period is followed by a cooling period in which the electrodes are cooled preferably by a liquid cooling technique. A production machine typically has a single heating station and may have multiple cooling stations.

In FIGS. 2-4 there is shown an upper electrode 20 and a lower electrode 22. The mold is shown in the form of a silicone rubber mold 24. An RF source 26 connects between the electrodes 20 and 22. In addition to the mold 24 there is also provided a plug 28 used in the process of the present invention. The plug 28 may also be constructed of a silicone rubber material preferably loaded so as to have a high dielectric constant.

FIG. 2 shows the mold 24, the electrodes 20 and 22, and the plug 28. Also shown in FIG. 2 is the uncompressed foam material 30 which is made of a shape that substantially conforms to the shape of the cavity in the mold 24. In FIG. 2 the distance a may be on the order of about 1 inch. Foam material 30 already has been prepared in a conventional manner known to those skilled in the art, such as by the use of an additive, or by treating the material, to render foam material 30 suitable for RF heating. Examples of such known methods of preparing foam material 30 are shown in the following U.S. Pat. Nos.: 3,640,913; 3,243,485; 3,242,238; 3,010,157; and 3,331,899.

FIG. 3 shows the next step in the process in which the foam material 30 has been compressed to a dimension b on the order of ⅛ inch. There is thus an 8 to 1 compression ratio. This ratio is preferably at least 2 to 1. It is also noted in FIG. 3 that this compression is carried out by means of the plug 28 which has moved in the direction of the arrow 32. The electrode 20 overlies the plug and the top surface of the mold 24. While the apparatus is in the position shown in FIG. 3 the RF generator 26 is energized and RF heating is applied between the electrodes 20 and 22. The majority of this heat is dissipated in the foam material and because of the compression thereof it has been found that the heating cycle can be reduced substantially which greatly enhances the desirability and flexibility of the present process. After the heating cycle has terminated, the plug is removed as indicated in FIG. 4 and the foam material 30 is simply permitted to expand so as to fill the mold cavity. In the embodiment illustrated herein the top electrode 20 in a sense forms one side of the mold cavity. In other arrangements a further dielectric material could be used in association with the top electrode for forming one side of the mold cavity.

Having described one embodiment of the present invention it should now be apparent to those skilled in the art that numerous other embodiments are contemplated as following within the scope of this invention. For example there has been illustrated herein particularly in FIGS. 2-4 one embodiment of an item that is being constructed. Obviously, many different sizes, shapes and configurations of an item can be formed. Also, inner surfaces of the mold cavity may be in the form of an imprint which is desired to be made on one or more surfaces of the part being molded. Also, there has been described herein the use of plastic foam materials such as polyethelene or polyproplene foams. Also, other types of thermal forming plastic foams may be employed. Also, in place of the die-cut foam material placed in the mold one can also use a liquid plastic such as plastisol with a blowing agent to provide the end product foam.

What is claimed is:

1. A process of forming a flexible, thermoplastic foam article using a mold with a mold cavity, a pair of electrodes across which an RF field may be impressed and compressing means, said process comprising the steps of:
   inserting a preform of the foam material into the mold;
   compressing the foam material with the compressing means;
   applying an RF heating field while maintaining the foam material compressed to heat the foam material to a temperature below the temperature at which the foam material would become permanently deformed into its compressed state;
   withdrawing the compressing means; and
   permitting the foam material to expand to conform to and in substance fill said mold cavity as the material cools to cause the foam material to permanently deform to assume the general shape and size of the mold cavity.

2. A process as set forth in claim 1 wherein said foam material is compressed by a compression ratio of at least 2 to 1.

3. A process as set forth in claim 1 wherein said foam material is compressed by a compression ratio of about 8 to 1.

4. A process as set forth in claim 1 including providing a plug to compress the foam.

5. A process as set forth in claim 4 including inserting the foam in a pre-formed shape substantially initially matching the shape of the mold.

6. A process as set forth in claim 5 wherein the step of compressing the foam is carried out by inserting the pre-formed foam into the mold and then compressing it by inserting the plug over the foam and into the mold.

7. A process as set forth in claim 6 wherein the plug compresses the foam in the ratio of at least 2 to 1.

8. An apparatus for forming a flexible, thermoplastic foam article comprising:
   a mold having a predetermined shape and size mold cavity;
   a pair of electrodes, one on each side of the mold;
   means for compressing a preform of the foam material in the mold cavity from a condition in which the foam material in substance fills said mold cavity, to a condition in which the foam material fills only a fraction of the volume of the mold cavity; and
   means for applying an RF heating field across the pair of electrodes while maintaining the foam material compressed over a heating period to heat the foam material to a temperature below the temperature at which the foam material would become permanently deformed into its compressed state; and
   means for withdrawing said compressing means to permit said foam material to expand after termination of the heating period to allow it to conform to and in substance fill said mold cavity as the material cools, the foam material being permanently deformed to assume the general shape and size of the mold cavity.

9. An apparatus for forming a foam plastic article as defined in claim 8 wherein said foam material is polyethylene foam.

10. An apparatus for forming a foam plastic article as defined in claim 8 wherein said foam material is polypropolene foam.

11. An apparatus for forming a foam plastic article as defined in claim 8 wherein said means for compressing includes a plug.

12. An apparatus for forming a foam plastic article as defined in claim 11 wherein either or both said mold cavity and plug have an imprint surface.

13. An apparatus as set forth in claim 11 wherein said plug fits into said mold over said foam.

14. An apparatus for forming a foam plastic article as defined in claim 8 wherein the foam material is ethylenevinylacetate.

15. An apparatus for forming a foam plastic article as defined in claim 8 wherein the foam material is polyvinylchloride.

* * * * *